(12) United States Patent
Becerra et al.

(10) Patent No.: US 10,908,590 B2
(45) Date of Patent: Feb. 2, 2021

(54) SYSTEM AND METHOD FOR ADJUSTING AN OPERATION OF A MOTOR

(71) Applicant: Regal Beloit America, Inc., Beloit, WI (US)

(72) Inventors: Roger Carlos Becerra, Fort Wayne, IN (US); Brian Lee Beifus, Fort Wayne, IN (US); Ludovic Andre Chretien, Columbia City, IN (US); Yao Da, Fort Wayne, IN (US); Glen Chester Young, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 632 days.

(21) Appl. No.: 14/335,335

(22) Filed: Jul. 18, 2014

(65) Prior Publication Data
US 2016/0020715 A1    Jan. 21, 2016

(51) Int. Cl.
*G05B 19/414*    (2006.01)

(52) U.S. Cl.
CPC .. *G05B 19/414* (2013.01); *G05B 2219/33302* (2013.01)

(58) Field of Classification Search
CPC ......... H02P 2005/30; H02P 2007/0088; H02P 2007/01; H02P 7/063; H02P 7/20; H02P 2007/56
See application file for complete search history.

(56) References Cited

U.S. PATENT DOCUMENTS

| | | | |
|---|---|---|---|
| 2,506,312 A | | 5/1950 | Morse |
| 3,477,003 A | | 11/1969 | Kato |
| 4,851,743 A | | 7/1989 | Schmerda et al. |
| 5,003,948 A | | 4/1991 | Churchill et al. |
| 5,290,205 A | * | 3/1994 | Densmore .......... A63B 22/0257 482/54 |
| 5,410,230 A | * | 4/1995 | Bessler ................ F24F 11/0009 318/471 |
| 5,689,168 A | | 11/1997 | Bogwicz et al. |
| 6,949,006 B1 | | 9/2005 | Chen et al. |
| 7,208,895 B2 | | 4/2007 | Marcinkiewicz et al. |

(Continued)

OTHER PUBLICATIONS

Duan Mingliang, Meng Yanjing, Speed Closed-loop Control System Based on General-purpose Inverter, IEEE, pp. 564-566.*

(Continued)

*Primary Examiner* — Bickey Dhakal
(74) *Attorney, Agent, or Firm* — Armstrong Teasdale LLP (57) ABSTRACT

A motor controller coupled to a motor is provided. The motor controller includes a processor, a memory coupled to the processor, a first input coupled to the processor, wherein the first input is associated with a first mode of operation, and a second input coupled to the processor, wherein the second input is associated with a calibration mode. The motor controller is configured to receive, through the first input, a first activation signal, operate the motor in the first mode of operation in response to receiving the first activation signal, while operating the motor in the first mode of operation, receive, through the second input, a second activation signal, in response to receiving the first activation signal and the second activation signal, adjust a value of a parameter associated with the first mode of operation, and store the value of the parameter in the memory.

16 Claims, 7 Drawing Sheets

(56) References Cited

U.S. PATENT DOCUMENTS

| | | | |
|---|---|---|---|
| 7,312,970 B2 | 12/2007 | Skinner | |
| 7,626,349 B2 | 12/2009 | Marcinkiewicz et al. | |
| 8,587,233 B2* | 11/2013 | Bass | H02P 6/28 |
| | | | 318/400.01 |
| 9,062,893 B2* | 6/2015 | Romanowich | F24F 13/1426 |
| 2006/0131293 A1* | 6/2006 | Kaufman | B23K 9/124 |
| | | | 219/137.71 |
| 2010/0117639 A1* | 5/2010 | Qin | G01V 13/00 |
| | | | 324/239 |
| 2010/0131083 A1* | 5/2010 | Leany | H02P 23/0027 |
| | | | 700/83 |

OTHER PUBLICATIONS

Spectral analysis of a PWM signal, Oct. 31, 2007 (Year: 2007) http://esorol.tarjoaa.fi/.*

* cited by examiner

SYSTEM AND METHOD FOR ADJUSTING AN OPERATION OF A MOTOR

BACKGROUND

The field of the disclosure relates generally to motor controllers, and more particularly, to systems and methods for adjusting an operation of a motor.

At least some known systems that include an electronically commutated motor (ECM) utilize a preconfigured set of parameters for controlling the operation of the motor. For example, an ECM may be operated at one of three stored speed settings, each associated with a respective mode of operation. Generally, values for the parameters for each mode of operation are configured by a manufacturer or distributor of the ECM before the ECM is installed at a field location. Typically, the values may only be adjusted by a service technician using relatively complicated and expensive equipment, such as a mobile computing device, that temporarily connects to the ECM or a motor controller, to display and adjust the values of the parameters.

BRIEF DESCRIPTION

In one aspect, a motor controller coupled to a motor is provided. The motor controller includes a processor, a memory coupled to the processor, a first input coupled to the processor, wherein the first input is associated with a first mode of operation, and a second input coupled to the processor, wherein the second input is associated with a calibration mode. The motor controller is configured to receive, through the first input, a first activation signal. The motor controller is additionally configured to operate the motor in the first mode of operation in response to receiving the first activation signal. Additionally, the motor controller is configured to, while operating the motor in the first mode of operation, receive, through the second input, a second activation signal. Additionally, the motor controller is configured to, in response to receiving the first activation signal and the second activation signal, adjust a value of a parameter associated with the first mode of operation, and store the value of the parameter in the memory.

In another aspect, a method for adjusting a value of a parameter associated with operation of a motor is provided. The method is implemented by a motor controller including a processor coupled to a memory, a first input, and a second input. The method includes receiving, by the motor controller through the first input, a first activation signal, operating the motor in the first mode of operation in response to receiving the first activation signal, while operating the motor in the first mode of operation, receiving, through the second input, a second activation signal, in response to receiving the first activation signal and the second activation signal, adjusting a value of a parameter associated with the first mode of operation, and storing the value of the parameter in the memory.

In another aspect, a motor controller coupled to a motor is provided. The motor controller includes a processor, a memory coupled to the processor, a first input coupled to the processor, a second input coupled to the processor, and a third input coupled to the processor. The motor controller is configured to receive, through the first input, a first activation signal, operate the motor in a first mode of operation in response to receiving the first activation signal, determine that the first activation signal is no longer being received through the first input, receive through the third input, a second activation signal, in response to receiving the second activation signal, reconfigure the processor such that when the first input is activated, the motor controller increases a value of a parameter associated with the first mode of operation and when the second input is activated, the motor controller decreases the value of the parameter associated with the first mode of operation.

In another aspect, a motor controller coupled to a motor is provided. The motor controller includes a processor, a memory coupled to the processor, and a plurality of inputs coupled to the processor. The motor controller is configured to receive, through at least one of the plurality of inputs, a first activation signal having a first type. The motor controller is additionally configured to operate the motor in a first mode of operation in response to receiving the first activation signal, receive, through at least one of the plurality of inputs, a second activation signal having a second type that is different from the first type, and in response to receiving the second activation signal of the second type, reconfigure the processor such that the motor controller selectively increases or decreases a value of a parameter associated with the first mode of operation.

DETAILED DESCRIPTION

Implementations of the systems and methods described herein enable values of parameters associated with different modes of operation of a motor to be adjusted (i.e., selectively increased or decreased). A motor controller includes an input that, when activated, causes the motor controller to function in a calibration mode to adjust the values of one or more parameters for one or more modes of operation. In one implementation, activating an input normally used to select a mode of operation, while simultaneously activating the input associated with the calibration mode, causes the motor controller to increase or decrease the value of a parameter, such as a motor speed, associated with the selected mode of operation. In some implementations, the motor controller determines timing information associated with activation and deactivation of the input associated with the calibration mode to selectively increment or decrement a value associated with the parameter.

In other implementations, the motor controller is coupled to an adjustment device that transmits an activation signal to the input associated with the calibration mode. In response, the motor controller configures itself to interpret activations of inputs normally used to select modes of operation as instructions to increase or decrease the value of a parameter. Accordingly, for example, in a system that includes two selectors (e.g., buttons), each normally used to select a corresponding mode of operation for the motor, the buttons may serve an additional purpose of increasing or decreasing the value of a parameter (e.g., motor speed) associated with a mode of operation.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
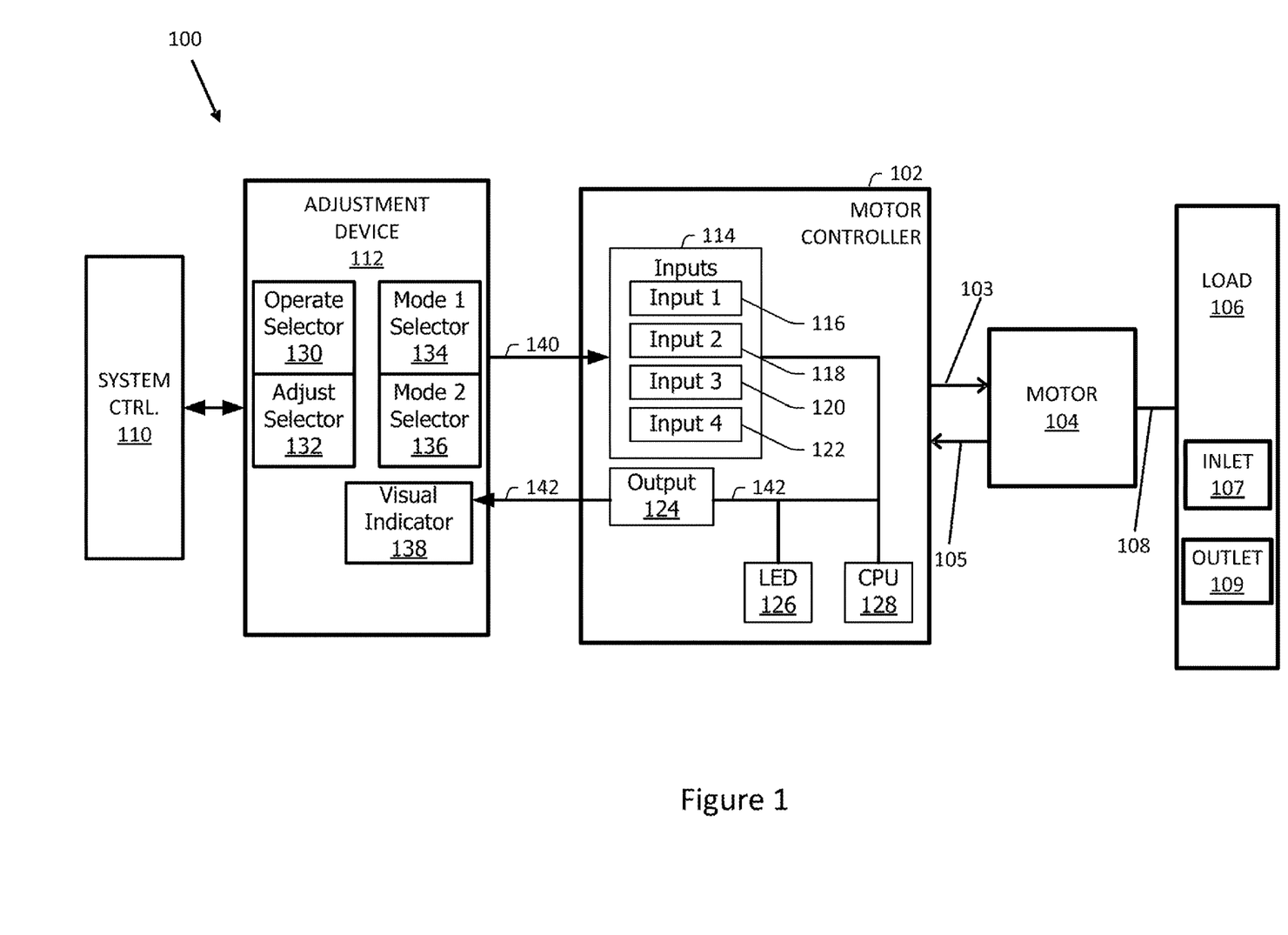
FIG. 1 is a block diagram of an example system that includes a motor controller coupled to a motor.

FIG. 1 is a block diagram of an example system 100 that includes a motor controller 102 coupled to a motor 104. Motor controller 102 transmits instructions 103 to motor 104 to control an operation of motor 104, and receives feedback 105 from motor 104 regarding the operational status of motor 104. In some implementations, motor controller 102 is incorporated within motor 104. Motor 104 may be an electric motor and, in some implementations, is an electric variable speed motor, such as an electronically commutated motor (ECM). Motor 104 drives a load 106 such as a fan or an impeller. Motor 104 is coupled to load 106 by a shaft 108. As motor 104 rotates shaft 108, air, water, or other fluid is received through an inlet 107 and forced out through an outlet 109. Accordingly, system 100 may be used, for example, in a heating, ventilation, and air conditioning (HVAC) system, a refrigeration system, or an aquatic system, such as a pool or spa.

In some implementations, system 100 additionally includes a system controller 110 that transmits and receives signals to and from motor controller 102, for example to activate functions of motor controller 102. For example, system controller 110 may transmit a signal to motor controller 102 to cause motor 104 to operate in one of a plurality of modes. In some implementations, an adjustment device 112 is coupled to motor controller 102, for example between system controller 110 and motor controller 102. As described herein, adjustment device 112 is configured to transmit signals to motor controller 102 to select a mode of operation for motor 104 and adjust the value of at least one parameter associated with the selected mode of operation.

Motor controller 102 includes a set of inputs 114, including a first input 116, a second input 118, a third input 120, and a fourth input 122. In some implementations, set of inputs 114 may be optically isolated using opto-couples (not shown). First input 116 may be activated by an activation signal 140, for example a 24 volt signal to select a first mode of operation of motor 104. Second input 118 may be activated by activation signal 140, to select a second mode of operation of motor 104. Third input 120 may be activated by activation signal 140, to select a third mode of operation of motor 104. Each mode of operation is associated with one or more parameters, as described in more detail herein. Fourth input 122 may be activated by activation signal 140 to enable a calibration mode for adjusting a value of one or more of the parameters. In some implementations, set of inputs 114 includes a different number of inputs associated with more or fewer modes of operation for motor 104. Additionally, in some implementations, set of inputs 114 may include a common input that receives a common voltage (e.g., ground).

Motor controller 102 additionally includes an output 124 that transmits a feedback signal 142 representative of a value of one of the parameters. Additionally, in some implementations, motor controller includes a first visual indicator, such as a light emitting diode (LED) 126 that receives feedback signal 142 and illuminates in response to feedback signal 142 to represent a value of a parameter for a selected mode of operation of motor 104, as described in more detail herein. Motor controller 102 additionally includes a computing device 128 configured to enable motor controller 102 to perform one or more functions described herein.

Adjustment device 112 includes an operate selector 130, an adjust selector 132, a first mode selector 134, a second mode selector 136, and a second visual indicator 138. When operate selector 130 is selected (e.g., pressed in) and first mode selector 134 is selected (e.g., pressed in), adjustment device 112 transmits activation signal 140 to first input 116. When operate selector 130 is selected and second mode selector 136 is selected, adjustment device 112 transmits activation signal 140 to second input 118. Accordingly, motor controller 102 causes motor 104 to operate in the first mode when operate selector 130 and first mode selector 134 are selected. Similarly, motor controller 102 causes motor 104 to operate in the second mode when operate selector 130 and second mode selector 136 are selected.

When adjust selector 132 is selected, adjustment device 112 transmits activation signal 140 to fourth input 122, causing motor controller 102 to function in a calibration mode. In the calibration mode, motor controller 102 configures computing device 128 to interpret an activation of first input 116 by activation signal 140 as an instruction to increase a value of a parameter associated with the most recent mode of operation of motor 104 and to interpret an activation of second input 118 as an instruction to decrease the value of the parameter associated with the most recent mode of operation of motor 104. In some implementations, power is removed from motor controller 102 and then reapplied before motor controller 102 functions in the calibration mode. More specifically, in some implementations, motor controller 102 is configured to, upon powering on, determine whether fourth input 122 is activated, and if so, to transition into the calibration mode to adjust the value of the least one parameter associated with the most recent mode that motor 104 was operated in (i.e., before power was removed). Visual indicator 138, for example a light emitting diode (LED), operates similarly to visual indicator 126. More specifically, visual indicator 138 receives feedback signal 142 and illuminates in response to feedback signal 142 to represent the value of the parameter for the selected mode of operation.

Figure 2:
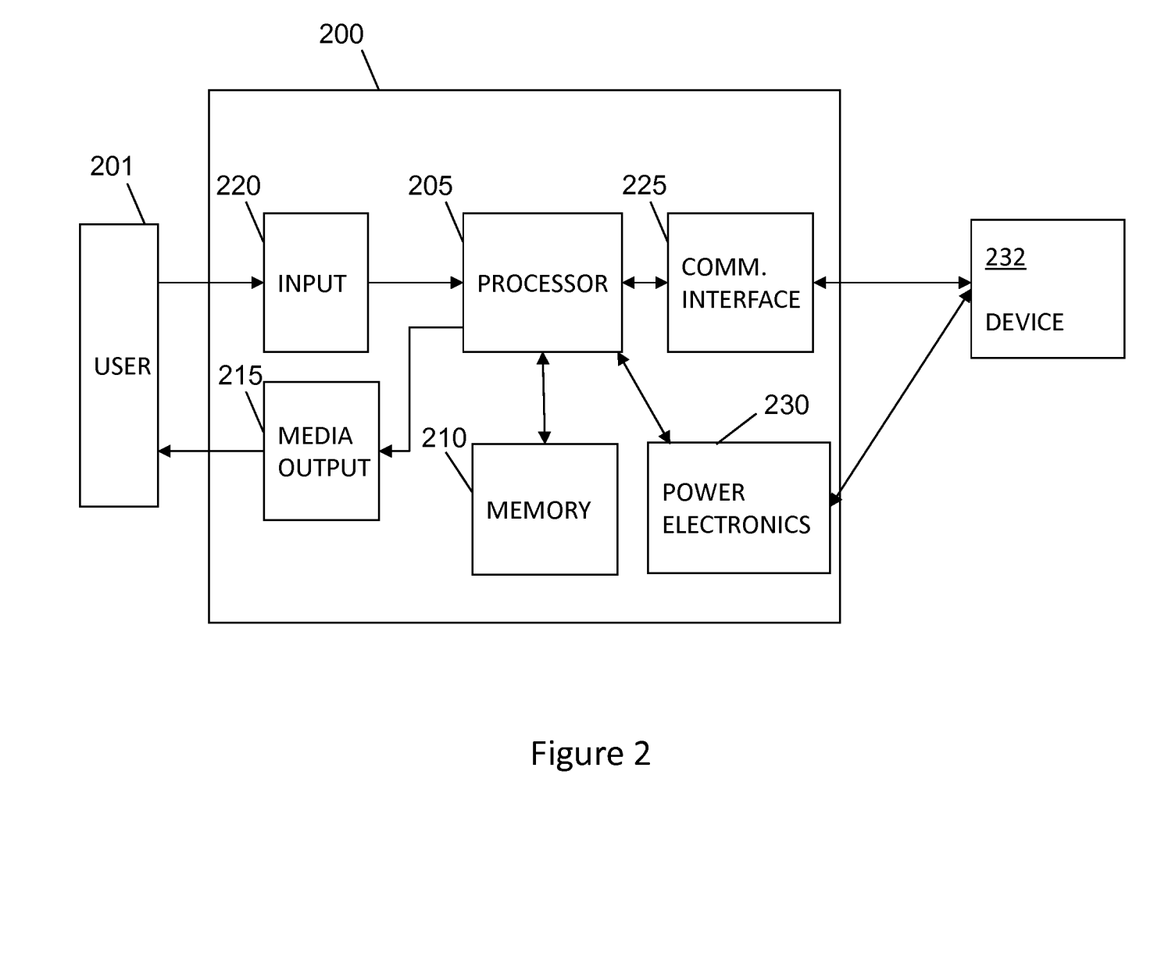
FIG. 2 is a block diagram of an example computing device included in the system of FIG. 1.

FIG. 2 is a block diagram of an example computing device 200. At least some components of computing device 200 are included in implementations of other devices describe herein, for example computing device 128. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. In computing device 128, memory area 210 stores values for parameters associated with various modes of operation for motor 104, as well as other data, as described in more detail herein. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), such as visual indicator 126, an organic light emitting diode (OLED) display, cathode ray tube (CRT), or "electronic ink" display) or an audio output device (e.g., a speaker or headphones). In other implementations, computing device 200 does not include media output component 215. For example, some implementations of computing device 128 (FIG. 1) may not include media output component 215.

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220. Some implementations of computing device 200, for example some implementations of computing device 128 (FIG. 1), do not include input device 220. In some implementations, for example with respect to motor controller 102 and computing device 128, input device 220 includes a button that activates fourth input 122 (FIG. 1), for example by coupling fourth input 122 to any of first input 116, second input 118, and third input 120 that is receiving activation signal 140, such that activation signal 140 is also received at fourth input 122.

Computing device 200 may also include a communication interface 225, which is communicatively couplable to another device 232, for example motor 104, adjustment device 112, and/or system controller 110. In some implementations, communication interface 225 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In some implementations, communication interface 225 includes, for example, one or more conductors for transmitting electrical signals and/or power to and/or from another device 232. Additionally, computing device 200 may also include power electronics 230 which may be coupled, for example, to processor 205 and motor 104.

Figure 3:
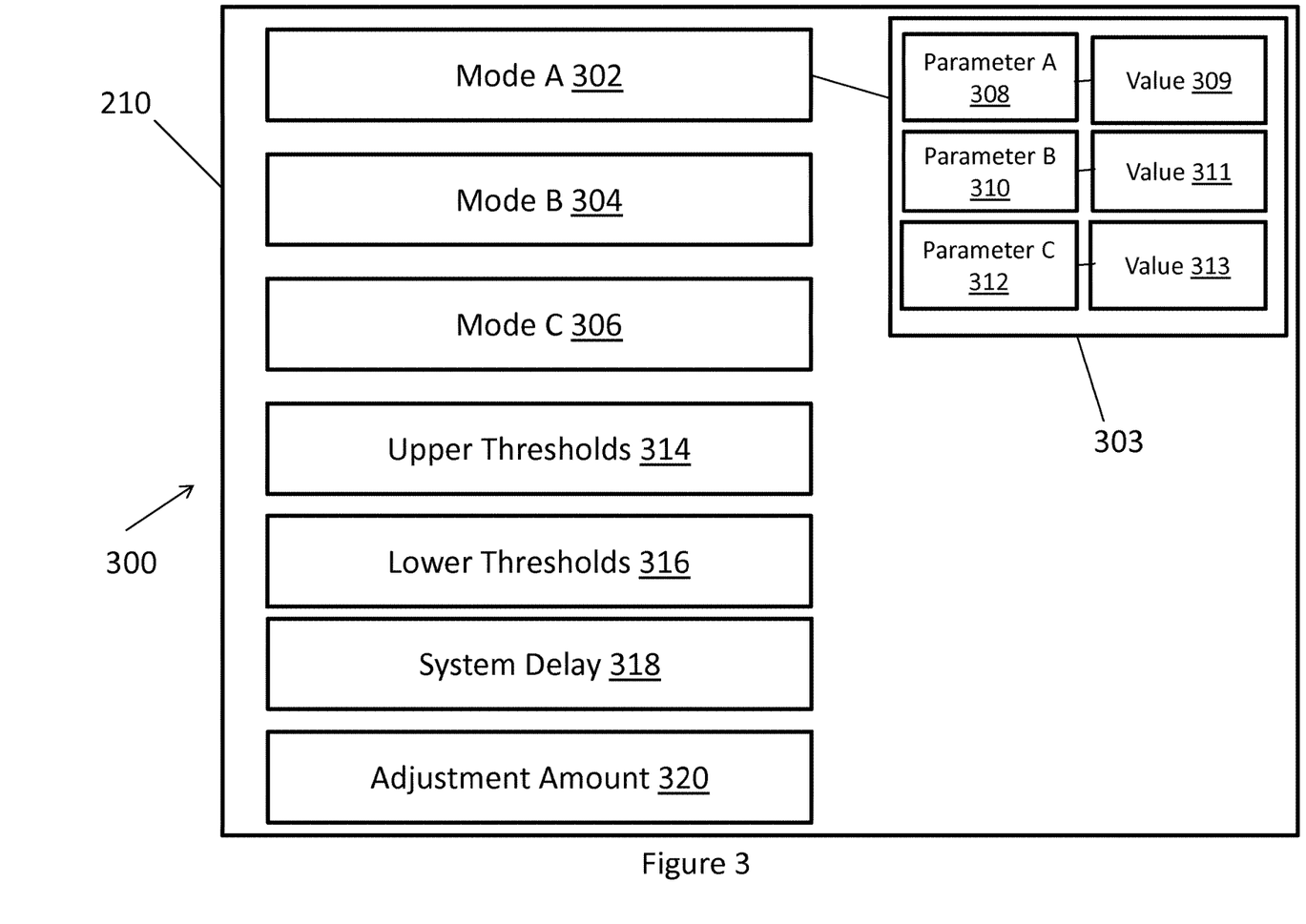
FIG. 3 is a block diagram of data stored in a memory of a computing device included in the motor controller of FIG. 1.

FIG. 3 is a block diagram of data 300 stored in memory 210 of computing device 128 included in motor controller 102. Memory 210 stores data 300 pertaining to a mode A 302, a mode B 304, and a mode C 306 for operation of motor 104. Each mode, for example mode A 302, is associated with a set of parameters 303. For example, set of parameters 303 includes a parameter A 308 and an associated first value 309, a parameter B 310 and an associated second value 311, and a parameter C 312 and an associated third value 313. In some implementations, parameter A 308 is a speed of motor 104, parameter B 310 is a torque of motor 104, and parameter C 312 is a fluid flow (e.g., airflow) to be generated by a fan (e.g., load 106) coupled to motor 104. Mode B 304 and mode C 306 are associated with corresponding parameter sets similar to parameter set 303. Data 300 additionally includes upper thresholds 314, which are numeric values that may not be exceeded for each parameter (e.g., parameter A 308, parameter B 310, and parameter C 312). For example, upper threshold 314 for parameter A 308, in some implementations, is 1800 rotations per minute (RPM). Data 300 additionally includes lower thresholds 316, which are minimum numeric values associated with each parameter (e.g., parameter A 308, parameter B 310, and parameter C 312). For example, lower threshold 316 for parameter A 308, in some implementations, is 300 RPM. In some implementations, parameters 303 may additionally or alternatively include one or more of a pressure and an audible noise.

Additionally, data 300 includes a system delay 318 which is a numeric value representing an amount of time (e.g., number of seconds or milliseconds) that must elapse before system 100 adjusts to a new value for a parameter, for example an increased motor speed. More specifically, due for example to inertia of the fan (load 106), motor 104 may not reach an increased speed (e.g., value 309) until a second after value 309 is set. Accordingly, in implementations in which system delay 318 is included in data 300, motor controller 102 waits for a time period equal to system delay 318 between adjustments of a value for a parameter (e.g., value 309 associated with parameter A 308). Additionally, data 300 includes an adjustment amount 320 that represents a numeric value of how much a value (e.g., value 309) of a parameter (e.g., parameter A 308) is adjusted with each increment or decrement of the value. For example, in some implementations, adjustment amount 320 is 100 RPM for parameter A 308.

Figure 4:
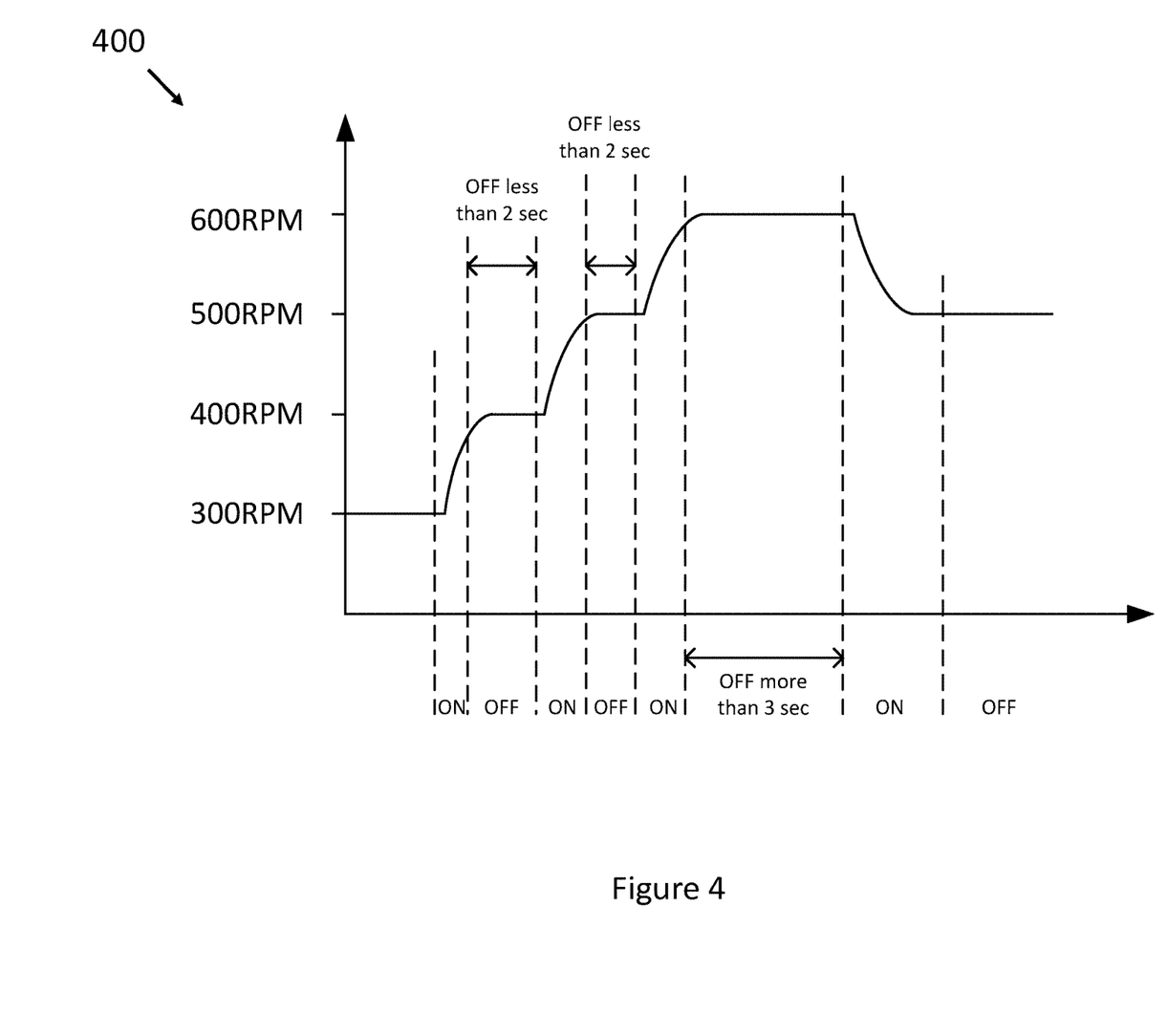
FIG. 4 is a graph of adjustments to a value of a parameter associated with a mode of operation of the motor shown in FIG. 1.

FIG. 4 is a graph 400 of adjustments to the value of a parameter associated with a mode of operation of motor 104. More specifically, graph 400 shows adjustments to value 309 associated with parameter A 308 (i.e., motor speed) for mode A 302. While first input 116 and fourth input 122 are activated, meaning first input 116 and fourth input 122 are receiving activation signal 140, motor controller 102 adjusts value 309. When fourth input 122 stops receiving activation signal 140, motor controller 102 no longer adjusts value 309. Depending on time intervals between activations of fourth input 122, motor controller 102 either increases or decreases value 309. More specifically, if a time period of less than two seconds elapses between activations of fourth input 122, motor controller 102 continues to adjust value 309 in a direction (i.e., increasing or decreasing) that value 309 was adjusted on the previous activation, unless value 309 has reached either upper threshold 314 or lower threshold 316.

If a period of three seconds or more elapses between activations of fourth input 122, then motor controller 102 reverses the direction of adjustment. For example, if fourth input 122 is activated and motor controller 102 increments value 309 by 100 RPM (i.e., adjustment amount 320) from 500 RPM to 600 RPM, then fourth input 122 is deactivated for at least three seconds, and is activated again, motor controller decrements value 309 by 100 RPM (i.e., adjustment amount 320) back to 500 RPM. Accordingly, by modulating the activations of fourth input 122, for example with a single button or jumper, a user (e.g., user 201) of motor controller 102 may easily adjust value 309. Similarly, values associated with mode B 304 may be adjusted when second input 118 is activated and activation of fourth input 122 is modulated as described above. Likewise, values for other modes of operation (e.g., mode C 306) may be adjusted when the corresponding input (e.g., third input 120) is activated and activation of fourth input 122 is modulated as described above. The time periods used for modulation in the above discussion are examples only and may differ in other implementations of motor controller 102.

Figure 5:
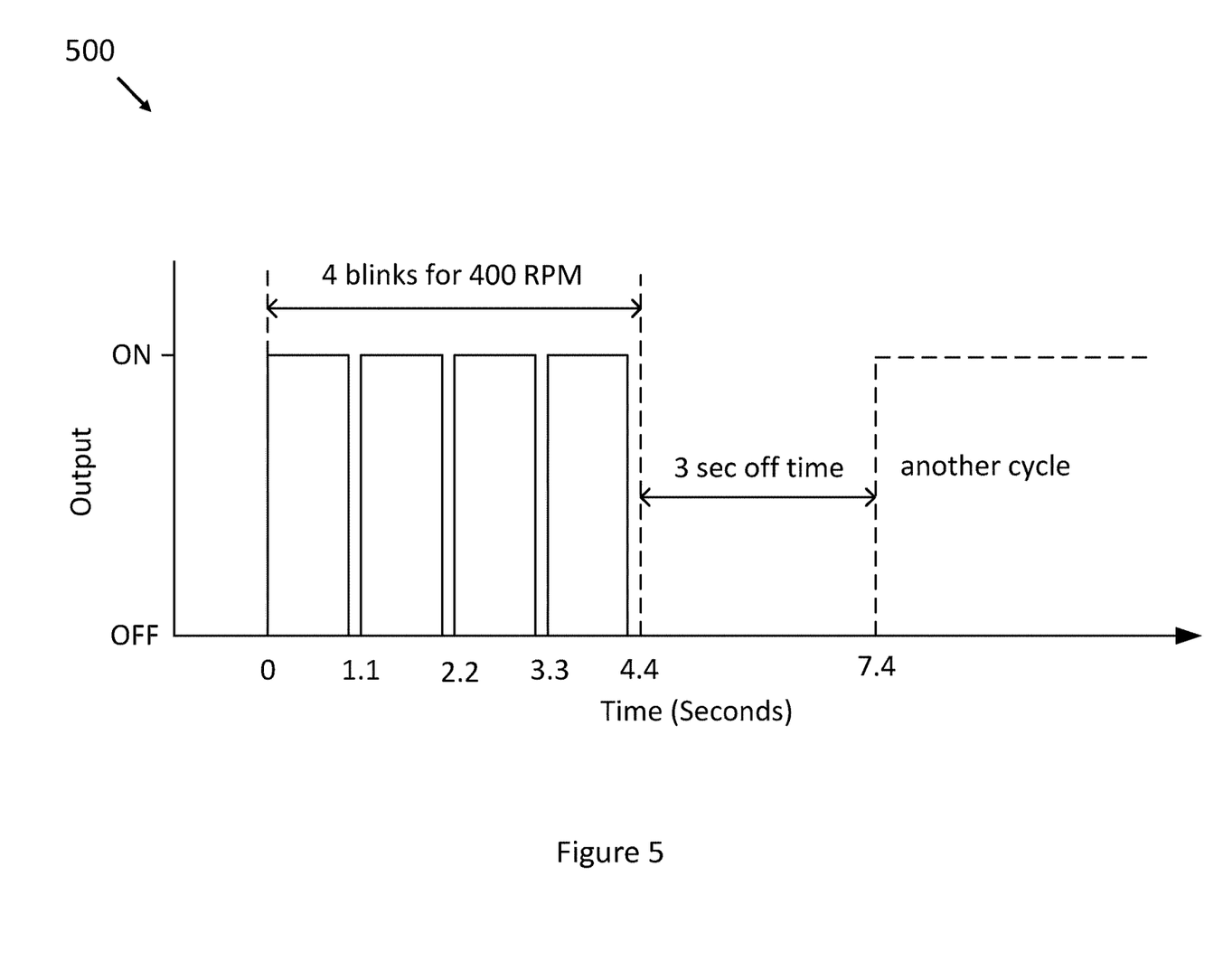
FIG. 5 is a graph of an output of a visual indicator in response to receiving a feedback signal generated by the motor controller shown in FIG. 1.

FIG. 5 is a graph 500 of an output of first visual indicator 126 generated in response to receiving feedback signal 142 (FIG. 1). More specifically, motor controller 102 causes feedback signal 142 to alternate between a low value (e.g., 0 volts) and a high value (e.g., 5 volts) in a pattern that represents a value associated with a parameter that is being or has been adjusted. For example, when value 309 is equal to 400 RPM, motor controller 102 sets feedback signal 142 to the high value for one second, then sets feedback signal 142 to the low value for a tenth of a second, four times. Accordingly, first visual indicator 126 pulses or illuminates four times, with each illumination representing 100 RPM. Accordingly, the four illuminations represent 400 RPM. Afterwards, motor controller 102 sets feedback signal 142 to the low value for three seconds, then repeats the illumination process again. In implementations that include second visual indicator 138 in addition to or instead of first visual indicator 126, second visual indicator 138 illuminates as described above. The time periods described above are examples only and may be different in other implementations of system 100.

Figure 6:
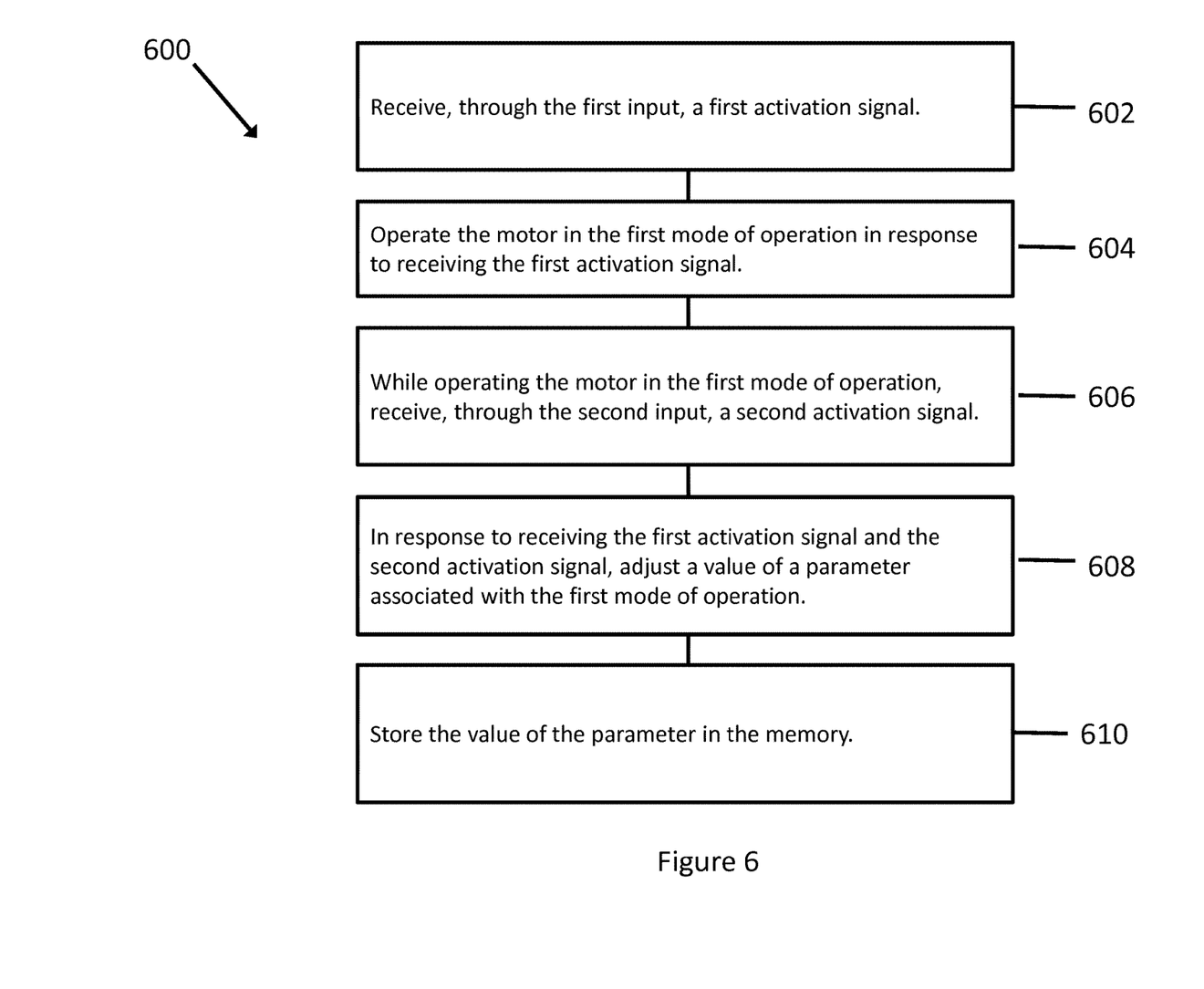
FIG. 6 is a flow chart of an example process performed by the motor controller of FIG. 1 in accordance with one aspect of the present disclosure.

FIG. 6 is a flow chart of an example process 600 performed by motor controller 102 in accordance with one aspect of the present disclosure. Initially, motor controller 102 receives 602, through first input 116, a first activation signal (e.g., activation signal 140). Additionally, motor controller 102 operates 604 motor 104 in a first mode of operation (e.g., mode A 302) in response to receiving the first activation signal (e.g., activation signal 140). Additionally, while operating motor 104 in the first mode of operation (e.g., mode A 302), motor controller 102 receives 606, through a second input (e.g., fourth input 122), a second activation signal (e.g., activation signal 140). In response to receiving the first activation signal (e.g., activation signal 140) and the second activation signal (e.g., also activation signal 140), motor controller 102 adjusts 608 a value (e.g., value 309) of a parameter (e.g., parameter A 308) associated with the first mode of operation (e.g., mode A 302). Additionally, motor controller 102 stores 610 the value (e.g., value 309) of the parameter (parameter A 308) in memory (e.g., memory 210).

In some implementations, motor controller 102 is configured such that operating motor 104 in the first mode of operation while receiving the second activation signal includes receiving the first activation signal while receiving the second activation signal. In some implementations, motor controller 102 is configured to incrementally increase or decrease the value of the parameter (e.g., value 309 of parameter A 308) while receiving the first activation signal (e.g., activation signal 140) and the second activation signal (e.g., also activation signal 140). In some implementations, motor controller 102 is additionally configured to determine that the value of the parameter (e.g., value 309 of parameter A 308) is equal to a predefined upper threshold value (e.g., upper threshold 314) or a predefined lower threshold value (e.g., lower threshold 316) and in response to determining that the value of the parameter is equal to the predefined upper threshold value or lower threshold value, stop incrementally increasing or decreasing the value of the parameter. In some implementations, motor controller 102 is additionally configured to determine that the second activation signal has not been received for a predefined time period (e.g., at least three seconds), receive the second activation signal after the predefined time period has elapsed, and incrementally decrease or increase the value of the parameter while receiving the first activation signal and the second activation signal, for example as described with reference to FIG. 4.

In some implementations, motor controller 102 is configured to increment or decrement the value of the parameter (e.g., value 309 of parameter A 308) at a rate that is calibrated to a system response time (e.g., system delay 318) associated with motor 104, for example as described with reference to FIG. 3. In some implementations, motor controller 102 is configured to transmit a feedback signal (e.g., feedback signal 142) to a visual indicator (e.g., at least one of first visual indicator 126 and second visual indicator 138) that causes the visual indicator to represent (e.g., illuminate in a pattern representative of) the value of the parameter (e.g., value 309 of parameter A 308). In some implementations, motor controller 102 is configured such that the first activation signal (e.g., activation signal 140) and the second activation signal (e.g., also activation signal 140) are 24 volts. In some implementations, motor controller 102 is additionally configured to determine an amount of adjustment made to a first value (e.g., value 309) and adjust at least a second value of a second parameter associated with a second mode of operation (e.g., mode B 304 and mode C 306) in proportion to the amount of adjustment made to the first value (e.g., value 309). For example, if the motor speed (value 309) associated with mode A 302 is increased by 20%, then motor controller 102 increases the motor speeds associated with mode B 304 and mode C 306 by 20% as well. In some implementations, motor controller 102 is configured such that the parameter is at least one of a speed (e.g., parameter A 308), a torque (e.g., parameter B 310), a fluid flow (e.g., parameter C 312), a pressure, and an audible noise.

Figure 7:
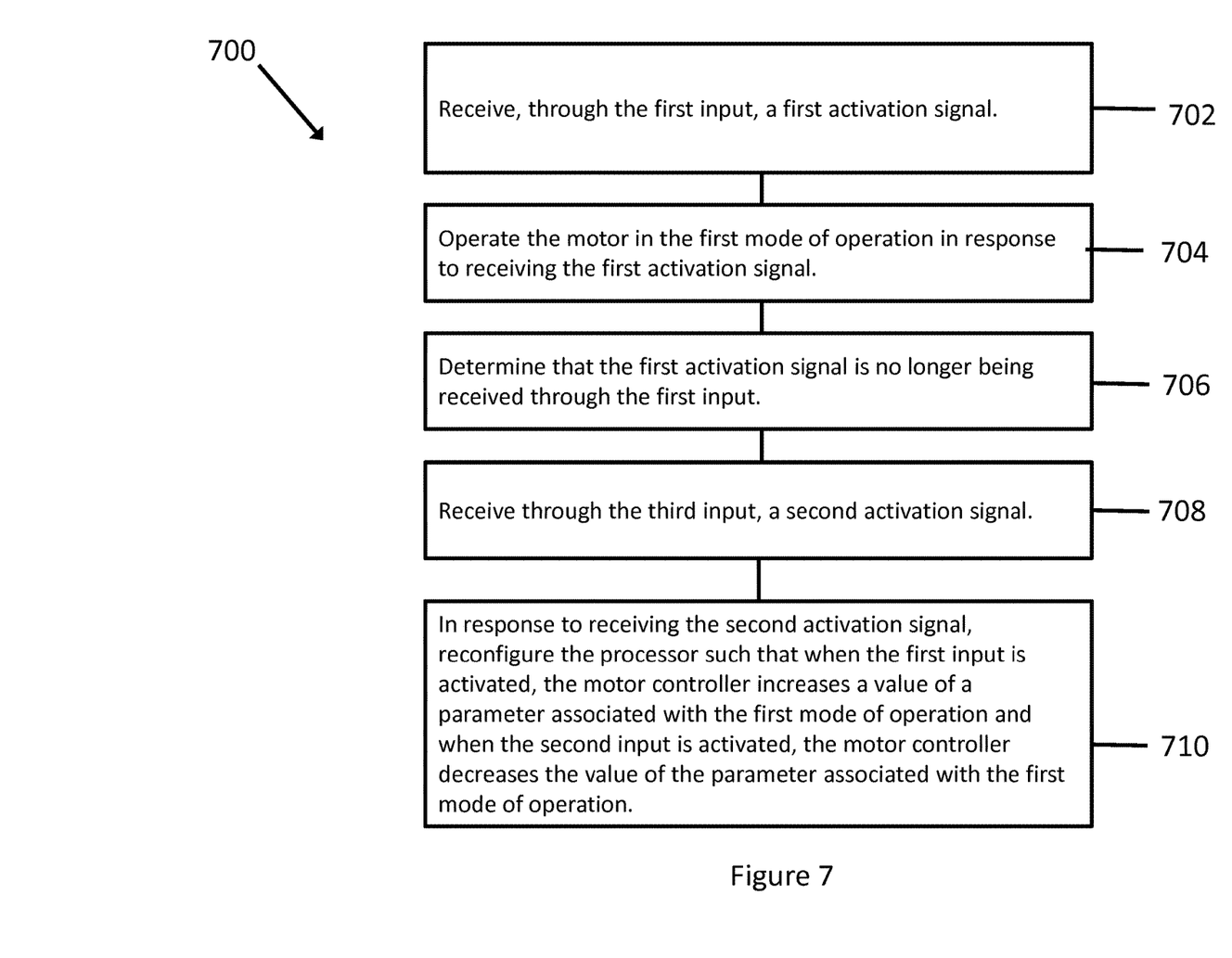
FIG. 7 is a flow chart of another example process performed by the motor controller of FIG. 1 in accordance with another aspect of the present disclosure.

FIG. 7 is a flow chart of an example process 700 performed by motor controller 102 in accordance with another aspect of the present disclosure. Initially, motor controller 102 receives 702, through a first input (e.g., first input 116), a first activation signal (e.g., activation signal 140). Additionally, motor controller 102 operates 704 motor 104 in a first mode of operation (e.g., mode A 302) in response to receiving the first activation signal. Additionally, motor controller 102 determines 706 that the first activation signal is no longer being received through the first input (e.g., first input 116). For example, adjust selector 132 is selected and operate selector 130 is deselected. Additionally, motor controller 102 receives 708 through a third input (e.g., fourth input 122), a second activation signal (e.g., activation signal 140). In response to receiving the second activation signal, motor controller 102 reconfigures processor 205 such that when the first input (e.g., first input 116) is activated, motor controller 102 increases a value of a parameter (e.g., value 309 of parameter A 308) associated with the first mode of operation (e.g., mode A 302) and when a second input (e.g., second input 118) is activated, motor controller 102 decreases the value of the parameter (e.g., value 309 of parameter A 308) associated with the first mode of operation (e.g., mode A 302).

In some implementations, motor controller 102 is further configured to store the value of the parameter (e.g., value 309 of parameter A 308) in memory 210 when power to the motor controller is removed. In some implementations, motor controller 102 is further configured to operate motor 104 in a second mode of operation (e.g., mode B 304) and reconfigure processor 205 such that when first input 116 is activated, motor controller 102 increases a second value of a second parameter associated with the second mode of operation (e.g., mode B 304) and when second input 118 is activated, motor controller 102 decreases the value of the parameter associated with the second mode of operation. For example, motor controller 102 may operate in mode B 304, then when fourth input 122 is activated, for example when adjust selector 132 is selected and operate selector 130 is deselected, motor controller 102 increases the motor speed for mode B 304 when first input 116 is activated (e.g., when first mode selector 134 is selected) and decreases the motor speed for mode B 304 when second input 118 is activated (e.g., when second mode selector 136 is selected). In some implementations, motor controller 102 is deactivated (i.e., external power is removed) and when motor controller 102 is reactivated, motor controller 102 determines a calibration mode to use. For example, if motor controller 102 is reactivated and, upon reactivation, fourth input 122 is activated and none of first input 116, second input 118, and third input 120 is activated, then motor controller 102 configures itself to use the calibration mode described with reference to FIG. 7, and otherwise uses the calibration mode described with reference to FIG. 6.

In some implementations, rather than reserving a specific input (e.g., one of first input 116, second input 118, and third input 120) for receiving an activation signal that causes motor controller 102 to enter a calibration mode, motor controller 102 is instead configured to enter the calibration mode when motor controller 102 receives an activation signal having a specific type (e.g., waveform and/or voltage) associated with the calibration mode. For example, in some implementations, motor controller 102 is configured to receive, through a first input (e.g., first input 116), a first activation signal 140 having a first type. For example, the first activation signal may have a first voltage and may have a first waveform. Motor controller 102 operates motor 104 in a first mode of operation (e.g., mode A 302) in response to receiving the first activation signal. Motor controller 102 receives, through at least one of the inputs (e.g., first input 116, second input 118, or third input 120), a second activation signal 140 having a second type that is different from the first type. More specifically, the second activation signal may have different voltage than the first activation signal, and/or may have a different waveform than the first activation signal. In some implementations, the first activation signal is a direct current signal, while the second activation signal is an alternating current signal, or vice versa.

In some implementations, motor controller 102 receives the first activation signal while receiving the second activation signal. In other implementations, the second activation signal replaces the first activation signal. Motor controller 102, in response to receiving the second activation signal of the second type, reconfigures processor 205 such that motor controller 102 selectively increases or decreases a value of a parameter (e.g., value 309 of parameter A 308) associated with the first mode of operation (e.g., mode A 302). For example, in some implementations, motor controller 102 receives at least a third activation signal 140 from at least one of the inputs (e.g., first input 116, second input 118, or third input 120), and, in response, motor controller 102, selectively increases or decreases a value of a parameter (e.g., value 309 of parameter A 308) associated with the first mode of operation (e.g., mode A 302). In some implementations, motor controller 102 receives the activation signal 140 having the second type upon powering on, and enters the calibration mode in response to receiving the activation signal 140 having the second type. In some implementations, motor controller 102 is configured to interpret a voltage on one or more of the inputs (e.g., first input 116, second input 118, and/or third input 120) that is lower than a switching threshold voltage of the input as an activation signal 140.

In some implementations, motor controller 102 enters the calibration mode in response to receiving a half wave rectified positive signal (e.g., activation signal 140) on a first input (e.g., first input 116) and a half wave negative signal (e.g., activation signal 140) on a second input (e.g., second input 118). More specifically, motor controller 102 detects a phase difference between the signals on the two inputs. Since the two signals occupy two inputs (e.g., first input 116 and second input 118), one of the input states needed for incrementing, decrementing, and/or holding a value of a parameter (e.g., value 309 of parameter A 308) is used up. To address this, motor controller 102 is configured to exit the calibration mode upon receiving any activation signal other than an increment, decrement, or hold input so that the calibration mode can persist after the half wave rectified positive signal and half wave negative signal are removed. Accordingly, while multiple inputs are used to enter the calibration mode, they are not required to be present for the whole calibration process.

The methods and systems described herein may be implemented using computer programming or engineering techniques including computer software, firmware, hardware or any combination or subset thereof, wherein the technical effect may include at least one of: (a) receiving, through a first input, a first activation signal; (b) operating a motor in a first mode of operation in response to receiving the first activation signal; (c) while operating the motor in the first mode of operation, receiving, through a second input, a second activation signal; (d) in response to receiving the first activation signal and the second activation signal, adjusting a value of a parameter associated with the first mode of operation; (e) storing the value of the parameter in memory; (f) determining that the first activation signal is no longer being received through the first input; (g) receiving through a third input, a second activation signal; and (h) in response to receiving the second activation signal, reconfiguring a processor such that when the first input is activated, the motor controller increases a value of a parameter associated with the first mode of operation and when the second input is activated, the motor controller decreases the value of the parameter associated with the first mode of operation.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for adjusting an operation of motor, the systems and methods described herein enable a user to easily adjust a value of a parameter associated with a mode of operation of a motor that has already been installed in a field location, without requiring expensive and complicated service equipment. Accordingly, the adjustment of the operation of such motors may be performed more efficiently than is possible with known systems and methods.

Exemplary embodiments of systems and methods for adjusting an operation of a motor are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller coupled to a motor, said motor controller comprising a processor, a memory coupled to said processor, a first input coupled to said processor, a second input coupled to said processor, and a third input coupled to said processor, said motor controller configured to:
   receive, through said first input, a first activation signal;
   operate the motor in a first mode of operation in response to receiving the first activation signal;
   determine that the first activation signal is no longer being received through said first input;
   receive through said third input, a second activation signal, said third input associated with a calibration mode of said motor controller;
   while receiving the second activation signal, reconfigure said processor such that when said first input is activated during the calibration mode, said motor controller increases a value of a parameter associated with the first mode of operation and when said second input is activated during the calibration mode, said motor controller decreases the value of the parameter associated with the first mode of operation.

2. The motor controller of claim 1, wherein the value is a first value and the parameter is a first parameter, and said motor controller is further configured to:
   operate the motor in a second mode of operation; and
   reconfigure said processor such that when said first input is activated, said motor controller increases a second value of a second parameter associated with the second mode of operation and when said second input is activated, said motor controller decreases the value of the parameter associated with the second mode of operation.

3. The motor controller of claim 1, wherein said motor controller is further configured to store the value of the parameter in the memory.

4. A motor controller coupled to a motor, said motor controller comprising a processor, a memory coupled to said processor, and a plurality of inputs coupled to said processor, said motor controller configured to:
   receive, through at least one of said plurality of inputs, a first activation signal having a first type, wherein the first type is one of a direct current (DC) signal and an alternating current (AC) signal;
   operate the motor in a first mode of operation in response to receiving the first activation signal;
   receive, through at least one of said plurality of inputs, a second activation signal in combination with receiving the first activation signal, the second activation signal having a second type, wherein the second type is the other of the one of the DC signal and the AC signal associated with the first activation signal; and
   in response to receiving both the first activation signal of the first type and the second activation signal of the second type, reconfigure said processor such that said motor controller selectively increases or decreases a value of a parameter associated with the first mode of operation.

5. The motor controller of claim 4, wherein said motor controller is further configured such that:
   receiving the first activation signal having the first type includes receiving the first activation signal having a first waveform; and
   receiving the second activation signal having the second type includes receiving the second activation signal having a second waveform that is different from the first waveform.

6. The motor controller of claim 4, wherein said motor controller is further configured such that:

receiving the first activation signal having the first type includes receiving the first activation signal having a first voltage; and receiving the second activation signal having the second type includes receiving the second activation signal having a second voltage that is different from the first voltage.

7. The motor controller of claim 4, wherein said motor controller is further configured such that receiving the second activation signal further comprises receiving the second activation signal in combination with receiving the first activation signal.

8. The motor controller of claim 4, wherein said motor controller is further configured such that receiving the first activation signal further comprises detecting that the at least one input has a voltage lower than a switching threshold of the input.

9. The motor controller of claim 4, wherein said motor controller is further configured to store the value of the parameter in the memory.

10. A method of adjusting a value of a parameter associated with operation of a motor, said method implemented by a motor controller including a processor coupled to a memory, a first input, a second input, and a third input, said method comprising:

receiving, by the motor controller through the first input, a first activation signal;

operating the motor in a first mode of operation in response to receiving the first activation signal;

determining, by the motor controller, that the first activation signal is no longer being received through the first input;

receiving, by the motor controller through the third input, a second activation signal, the third input associated with a calibration mode of the motor controller; and while receiving the second activation signal, reconfiguring the motor controller such that when the first input is activated during the calibration mode, the motor controller increases a value of a parameter associated with the first mode of operation and when the second input is activated during the calibration mode, the motor controller decreases the value of the parameter associated with the first mode of operation.

11. The method of claim 10, wherein the value is a first value and the parameter is a first parameter, said method further comprises:

operating the motor in a second mode of operation; and reconfiguring the motor controller such that when said first input is activated, the motor controller increases a second value of a second parameter associated with the second mode of operation and when the second input is activated, the motor controller decreases the value of the parameter associated with the second mode of operation.

12. A method of adjusting a value of a parameter associated with operation of a motor, said method implemented by a motor controller including a processor coupled to a memory, and a plurality of inputs coupled to said processor, said method comprising:

receiving, by the processor through at least one of the plurality of inputs, a first activation signal having a first type, wherein the first type is one of a direct current (DC) signal and an alternating current (AC) signal;

operating, by the processor, the motor in a first mode of operation in response to receiving the first activation signal;

receiving, by the processor through at least one of the plurality of inputs, a second activation signal in combination with receiving the first activation signal, the second activation signal having a second type that is different from the first type, wherein the second type is the other of the one of the DC signal and the AC signal associated with the first activation signal; and in response to receiving both the first activation signal of the first type and the second activation signal of the second type, reconfiguring the processor such that the motor controller selectively increases or decreases a value of a parameter associated with the first mode of operation.

13. The method of claim 12, wherein:

receiving the first activation signal having the first type comprises receiving the first activation signal having a first waveform; and receiving the second activation signal having the second type comprises receiving the second activation signal having a second waveform that is different from the first waveform.

14. The method of claim 12, wherein:

receiving the first activation signal having the first type comprises receiving the first activation signal having a first voltage; and receiving the second activation signal having the second type comprises receiving the second activation signal having a second voltage that is different from the first voltage.

15. The method of claim 12, wherein receiving the second activation signal further comprises receiving the second activation signal in combination with receiving the first activation signal.

16. The method of claim 12, wherein receiving the first activation signal further comprises detecting that the at least one input has a voltage lower than a switching threshold of the input.

* * * * *